United States Patent Office.

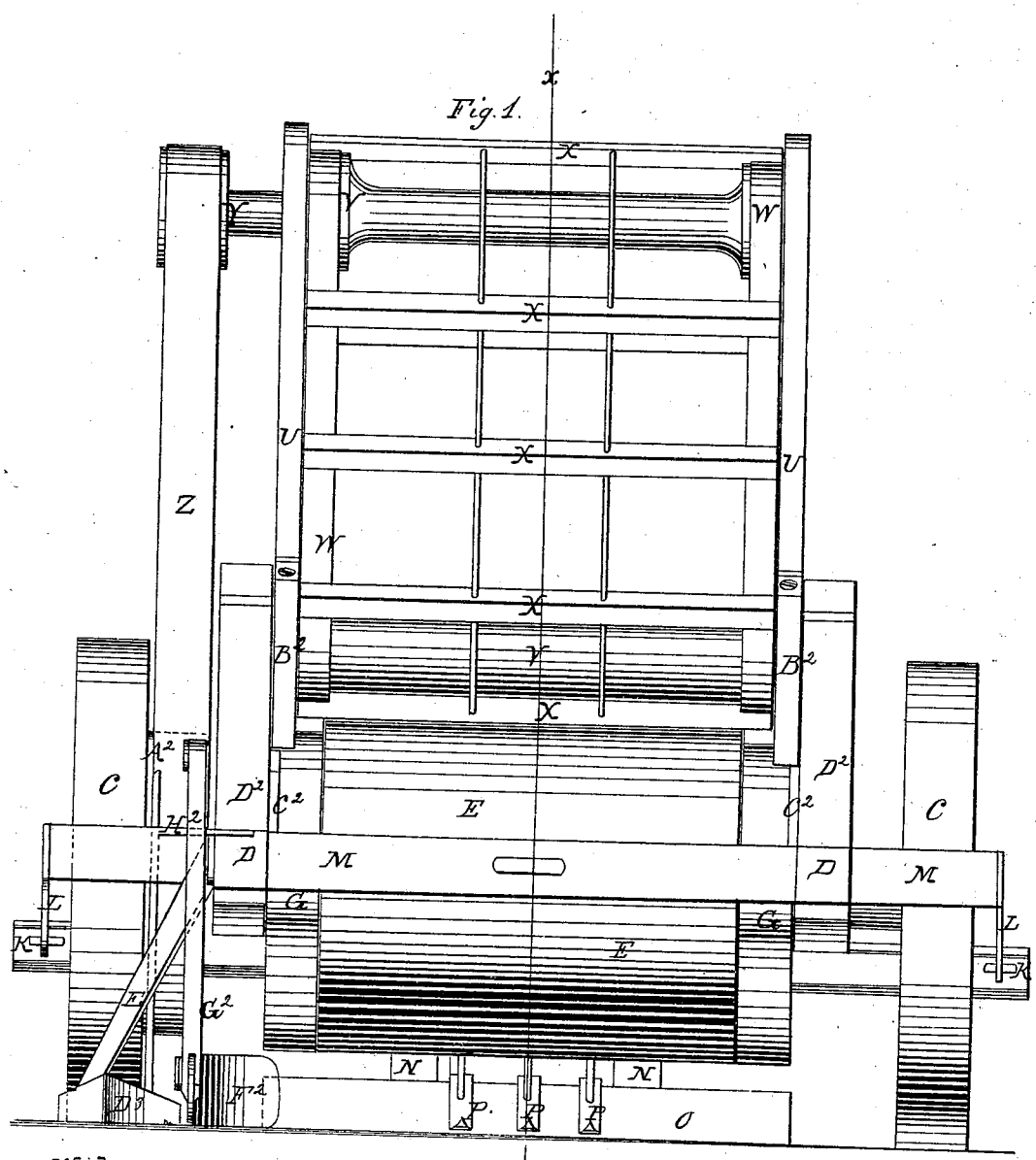

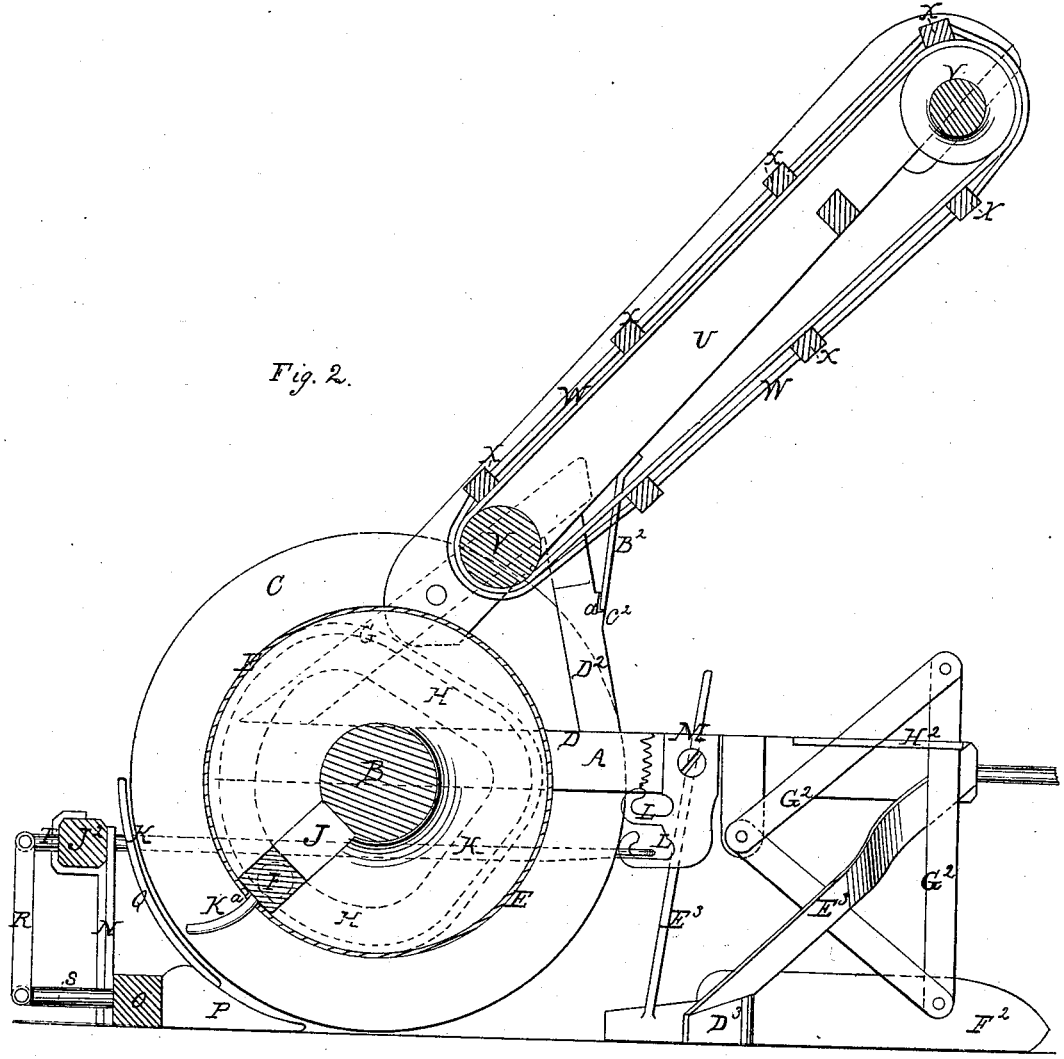

W. A. DUNCAN, OF SYRACUSE, NEW YORK.

Letters Patent No. 67,176, dated July 30, 1867; antedated July 13, 1867.

---

IMPROVEMENT IN MACHINE FOR RAKING AND LOADING HAY

---

The Schedule referred to in these Letters Patent and making part of the same.

---

TO ALL WHOM IT MAY CONCERN:

Be it known that I, W. A. DUNCAN, of Syracuse, in the county of Onondaga, and State of New York, have invented certain new and useful improvements in a "Hay-Rake and Loader," and that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The present invention consists, first, in so hanging the rake that it cannot dump, and also be susceptible of being adjusted to the various kinds of hay or grain in connection with which it may be used; second, hanging the rake to the machine, so that it will be drawn outside of the driving-wheels, thus preventing it from becoming clogged; third, in so hanging in front of one or both of the driving-wheels of the machine a clearer, that, as the machine is drawn over the ground, the hay scattered upon it will be cleared thereby from the track or tracks of the driving-wheels by being either thrown to the outside or inside of such wheels, as may be deemed best, the clearer, when throwing the hay inside of the driving-wheels, serving as a gatherer for the same.

In addition to the above, which compose the principal and most important features and principles of the present invention, I have also made many other minor improvements that, in connection, serve to secure a most perfect operation of the same. In the accompanying plate of drawings my improvements in a hay-rake and loader are illustrated—

Figure 1 being an elevation of the front end of a hay-rake and loader made according to the present invention, and Figure 2 a central longitudinal vertical section taken in the plane of the line $x$ $x$, fig. 1.

A A, in the drawings, represent the principal or main framework of the machine, to which the various parts constituting the same are hung or secured, as will be now explained, the frame being of suitable construction to receive and accommodate the same. At or near the rear end of the frame A, and extending across the same from one side to the other, is hung an axle-shaft, B, so as to freely turn therein, which axle-shaft projects at each side of the frame, and has secured to it at such projecting ends similar driving and traction-wheels, C. To that portion of the axle-shaft B embraced between the side pieces D of the frame A, a hollow cylinder or drum, E, is secured, that at each end is closed by head-plates, and revolves between disks G secured to the frame A, which disks upon their face or side in contact with the heads of the cylinder are each provided with a similar cam groove or way H of the shape shown by dotted lines in fig. 2. In these cam grooves or ways H the ends of a bar or rail, I, play or move, which bar passes through a radial slot, J, made in each end of the cylinder E, and extends the entire length of the cylinder. To and along this bar I a series of bent or curved teeth, K, is secured. These teeth extend toward the outside of the cylinder through apertures, through which they are made to pass, and thus to project from the cylinder at the proper time in its revolution by the action of the cam grooves or ways H upon the bar I, when, continuing the rotation, such teeth are drawn back into the cylinder by the action of said grooves and again thrown out, and so on, for purposes to be hereinafter specified. It may be here remarked, before proceeding with the description of the remaining portions of my machine, that it is intended to have a series of the toothed bars I arranged in the cylinder in a manner similar to that above explained, although in the drawings I have shown but one. Across the rear end of the machine a draw-bar, $J^1$, extends, that at each end is hung by rods K passing outside of the driving-wheels C to and upon the hooks L at the outer ends of the cross-bar M of the framework A, which passes in front of the said wheels. To the draw-bar J is hung, through standards N, the rake-bar O, so as to rest upon the ground, or nearly so, these standards, at their upper ends, being loosely looped or clasped about the draw-bar. To the rake-bar O a series of rake-teeth, P, is secured, which teeth project toward and under the revolving cylinder E in position for raking and gathering up the hay scattered upon the ground, as the machine in any suitable manner is drawn over it, the teeth terminating at their inner ends in upward projecting curved arms Q. To prevent the rake from dumping, when it catches in the ground at the point of its teeth, I connect the rake-bar O to the draw-bar J in addition to hanging it upon the same by the loop-standards N through rear vertical lever or link-pieces R, that, at their lower ends, are hung to the projecting arms S of the rake-bar, and at their upper ends to the projecting arms T of the draw-bar. To the main frame A of the machine, in front of the cylinder E, a frame, U, is hung at one end so as to swing, which frame extends upward in an inclined direction toward the front end of the framework A. At each end of this frame U a roller, V, is hung, so as to turn, around which rollers, from one to the other, passes an endless apron or belt, W, provided at suitable points of its length with transverse cleats or strips X. To the outer end of the upper one of the rollers V a pulley, Y, is secured, around which passes an endless belt or band, Z, that, at its opposite end, passes around a pulley, $A^2$, secured to the axle and driving-shaft B of the machine, by which means the endless apron W is driven as the machine is drawn over the ground. To the under side of the endless apron frame U pawls $B^2$ are secured in position to engage with the teeth or notches $a$ of rack-bar $C^2$ permanently fixed or secured to the uprights $D^2$ of the framework A, the purpose of which pawls and racks is to enable the frame U to be more or less inclined in direction, according to the height which it is necessary to have its upper end to accommodate it to the ever-varying height of the hay in the wagon as it is loaded with the same.

The operation of the machine above described is as follows: As it is drawn over the ground upon which the hay to be gathered and loaded in a wagon is scattered, the rake-teeth of the rake-bar gather and rake up the hay, from which, by the teeth $K^*$ of the cylinder E, (which teeth then project from the cylinder through the openings $a$ in the same and pass between the rake-teeth,) the hay is then taken and carried up by them to the endless apron, to be carried by it to the wagon, the teeth of the cylinder, as they reach the said endless apron with the hay, being drawn into the cylinder, and thus leaving the hay free to be taken up by the endless apron, as is manifest without any further explanation. To clear the hay from the ground in front of the driving-wheels of the machine as it passes over the same, I have placed in front of the wheels a clearer-board or plate, $D^3$, that, by means of extension arms, $E^3$, is secured to the framework A, this clearer-board in the present instance being inclined in a direction to throw the hay to the outside of the wheels. In connection with the clearer-board $D^3$ I have also arranged, just in front or in advance of it, a gatherer-board, $F^2$, which board, through a triangular-shaped frame, $G^2$, is hung to the framework A in a vertical plane, moving in guide-pieces $H^2$ of the same, the purpose and object of this gatherer being to gather in the hay upon the ground toward the centre of the machine for being taken up by the revolving rake-tooth cylinder. The adjusting of the rake to the different kinds of hay or grain in connection with which the machine is to be used can be accomplished by providing a series of hooks at L to receive the ends of the lever or draw-bars K, or by lengthening or shortening the connection through the link-pieces between the draw-bar $J^2$ and rake-bar O, for which purpose a series of apertures is to be made in such link-pieces.

What I claim as my invention, and desire to secure by Letters Patent, is—

1. The rake-bar O, suspended by the standard N from the draw-bar $J^2$, hung by the adjustable rods K on hooks L, in combination with link-pieces R pivoted at one end to the projecting arm T of the draw-bar $J^2$, and at the other end to the projecting arms S of the rake-bar O, substantially as described for the purpose specified.

2. The clearer-board $D^3$ attached to the extension arms $E^3$ and gatherer-board $F^2$ hung from the triangular frame $G^2$, all secured to the frame A, when arranged to operate together substantially as described for the purpose specified.

The above specification of my invention signed by me this ninth day of July, 1866.

W. A. DUNCAN.

Witnesses:
JOSEPH M. DUNCAN,
JOHN BARNEY.